United States Patent [19]

Mohr

[11] 4,059,288
[45] Nov. 22, 1977

[54] PRESSURE BALANCED SAFETY PIPELINE CONNECTOR

[75] Inventor: Harvey O. Mohr, Houston, Tex.

[73] Assignee: HydroTech International, Inc., Houston, Tex.

[21] Appl. No.: 719,437

[22] Filed: Sept. 1, 1976

[51] Int. Cl.$^2$ ............... F16L 35/00; F16L 37/00
[52] U.S. Cl. .................................. 285/2; 285/4; 285/23; 285/101; 285/DIG. 1
[58] Field of Search ............. 285/1, 2, 3, 4, 23, 285/95, DIG. 1, 114, 101, 100

[56] References Cited

U.S. PATENT DOCUMENTS

| | | | |
|---|---|---|---|
| 2,018,455 | 10/1935 | Lofton | 285/2 |
| 2,052,046 | 8/1936 | Lambie | 285/18 |
| 3,889,985 | 6/1975 | Gartmann | 285/95 |

Primary Examiner—Reinaldo P. Machado

[57] ABSTRACT

A separable and at least partially pressure balanced safety pipeline connector. The connector is arranged to be included in a pipeline and provide a pressure balanced weak point whereby the connector will separate at a predetermined tension load but which will be insensitive or substantially insensitive to operating line pressure. It includes a housing having one axial end adapted for connection to the pipeline and with the other axial end open. The connector includes a pipe extension member having one axial end adapted for connection to the pipe-line for transmission of line fluids therethrough and with the other axial end arranged for being telescopically received coaxially in the housing in sealed relationship therewith. A shear disc is mounted between the housing and extension member for restraining the same against axial separation in response to axial tension forces applied thereto. The shear disc is arranged to be rupturable at a pre-determined level such that axial separation is prevented below said level and is permitted above said level. The housing and extension member are arranged so as to provide an annular chamber therebetween whereby application of fluid pressure to the chamber urges the housing and extension members axially together to thereby balance line pressure. A port is provided through the extension member to communicate line pressure to the chamber.

4 Claims, 3 Drawing Figures

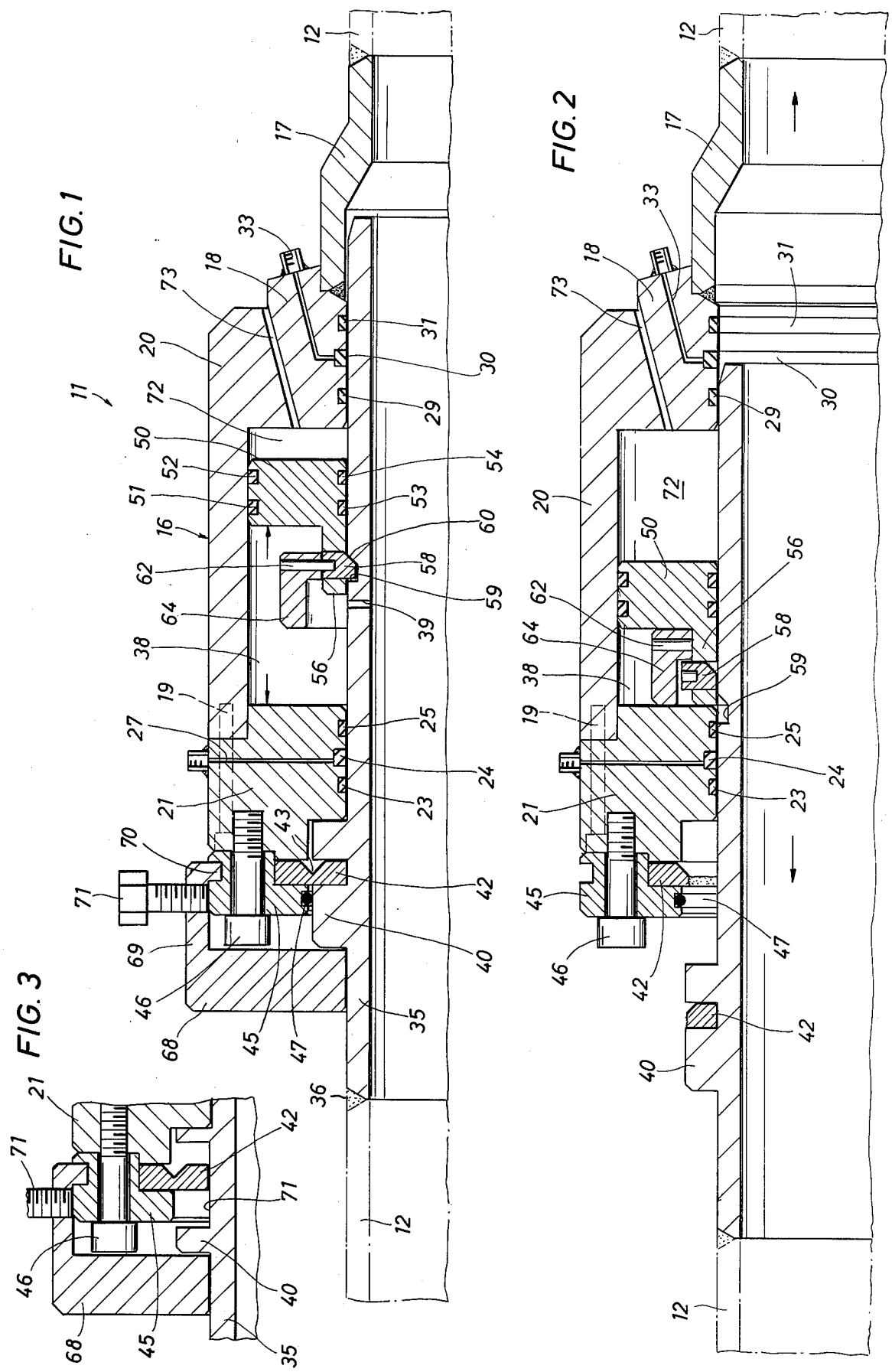

PRESSURE BALANCED SAFETY PIPELINE CONNECTOR

BACKGROUND OF THE INVENTION a. Field Of The Invention

This invention relates to a connector for inclusion in a sub-sea pipeline, for example, to thereby provide the same with a controlled weak point. More particularly, this invention relates to an apparatus which provides a controlled weak point which is relatively insensitive to line pressure.

b. Description Of The Prior Art

In installing and operating many sub-sea pipelines, it is often desirable to have a weak point therein at which place the line will part in response to a pre-determined tension load applied thereto. Certain places where it would be desirable to have such weak points might be at a place in the line where a branch line enters the main trunk line. By placing such a weak point in the branch line at the point adjacent to the trunk line, the branch line would be parted at a tension force level below that which would cause damage to the main trunk line. For example, such tension forces might be applied to a branch line by an underwater anchor being hooked thereon inadvertently. In normal application, if such a branch line were hooked and pulled excessively, the trunk line would likely be buckled or damaged in similar manner. By having a separable weak point placed next to the trunk line, the branch line would simply break away without damage to the trunk line.

Another point where it may be desirable to have a weak point in an underwater pipeline might be at the bottom of the riser pipe which is fastened to an offshore production platform. Occasionally, a pipeline will be pulled by an anchor being hooked onto it or by loads being exerted by storm conditions. If the pipeline at the bottom of the riser is not weakened by a weak joint, then the riser pipe might actually be pulled away from the platform, causing damage to the riser in the form of a buckle or rupture.

SUMMARY OF THE INVENTION

It is, therefore, an object of this invention to provide an improved separable and at least partially pressure balanced safety pipeline connector for providing a weak point in a pipeline which is arranged for parting at a pre-determined load which may be pre-determined by the pipeline operator.

Briefly stated, the safety pipeline connector of this invention comprises a housing having one axial end adapted for connection to the pipeline and having the other axial end open. A pipe extension member is provided having one axial end adapted for connection to the pipeline for transmission of line fluids therethrough, and with the other axial end arranged to be telescopically received co-axially in said housing in sealable relationship therewith. The invention includes shear means for restraining the housing and extension member against axial separation in response to axial tension forces applied thereto below a pre-determined level and shearable above said level to permit axial separation of the housing and extension member. Pressure balancing means are provided which are cooperative with the housing and the extension member for forming an annular pressure chamber about the extension member, whereby application of fluid pressure to the annular chamber causes the housing and extension members to be urged axially together. Conduit means are provided for communicating line pressure into the annular chamber, whereby the effect of line pressure in the pipeline normally urging axial separation of the housing and extension member is at least partially balanced by the balancing means.

The shear means may be in the form of a rupturable disc supported between the housing and the extension member. The pressure balancing means may include an annular piston releasably attached to the extension member and supported within the housing.

In certain instances, the shear means may be provided with a certain amount of free travel to permit a certain amount of axial compression and extension of the connection without inducing rupture of the shear means.

BRIEF DESCRIPTION OF THE DRAWING

FIG. 1 is a partial central sectional view of the pressure balanced safety pipeline connector of this invention shown in the position prior to being placed in the operable condition.

FIG. 2 is a view generally similar to FIG. 1 but showing the elements of the connector in the process of becoming separated.

FIG. 3 is a fragmentary section view of an alternative embodiment of the invention.

DESCRIPTION OF THE PREFERRED EMBODIMENT

The pressure balanced safety pipeline connector of this invention is generally designated by the numeral 11 and is shown mounted in pipeline 12.

Connector 11 is generally comprised of cylinder housing 16 which is comprised of means for attaching to pipeline 12 in the form of sub 17 which attachment may be by welding or the like. Sub 17 is in turn attached by welding to annular cylinder head 18 which in turn has welded thereto a generally tubular shaped cylinder wall 20. The opposite end of wall 20 has attached as by bolts 19 an annular cylinder end 21.

Cylinder end 21 has three annular internal recesses which are arranged to receive seals 23, 24 and 25, the purposes of which will be discussed hereinafter. In addition, seal 24 may be of the pump down type whereby fluid pressure can be applied through valved conduit 27 provided in end 21 to effect additional sealing. Similarly, cylinder head 18 is provided with three internal annular recesses in which are received seals 29, 30 and 31. Again, seal 30 may be of the type to be pumped downwardly by the application of fluid pressure through valved conduit 33 provided in head 18.

The invention includes pipe extension member 35 which is adapted for attachment to another portion of pipeline 12 by weld 36, for example. Extension member 35 is arranged for telescoping mounting inside of housing 16 as shown in FIG. 1 in sealable relationship therewith. Seals 23, 24, 25, 29, 30 and 31 are arranged for sealing with extension member 35. When extension member 35 is mounted in the position shown in FIG. 1, an annular chamber 38 is formed thereabout in cooperation with housing 16. Extension member 35 is provided with one or more radial ports 39 communicating from the interior of extension member 35 to annular chamber 38, so that pipeline pressure is applied thereto.

Extension member 35 also has provided on the exterior surface thereof an annular radially outwardly extending flange 40, the forward shoulder of which is arranged to butt against the mating shoulder provided on cylinder end 21. In addition, flange 40 has an annular groove thereabout which is arranged to receive a split shear disc 42 having a machined V shaped recess 43 provided therein. The depth of recess 43 controls the amount of tension forces required to shear disc 42 as will be discussed hereinafter. The circumferentially outward portion of disc 42 is arranged to butt against another shoulder portion of cylinder end 21 as shown in FIG. 1. The opposite side of shear disc 42 is arranged to be butted by annular end ring 45 which is held in place by plurality of bolts 46 which are threadably received in cylinder end 21 as shown. End ring 45 may be provided with an internal annular recess to accommodate seal 47 for engaging flange 40 to prevent entry of sea water and the like into the tool from that end.

Pressure balancing means of the invention also include an annular piston 50 shown mounted inside of cylinder wall 20 and having a pair of annular grooves thereabout in which are mounted a pair of seals 51 and 52 for effecting a fluid seal with the internal surface of cylinder wall 20. The internal surface of piston 50 is also provided with a similar pair of annular grooves which are arranged to receive seals 53 and 54 which are arranged to seal with the external surface of the adjacent portion of extension member 35. Piston 50 has an axially extending portion 56 having one or more radially extending openings, each of which is arranged to receive and has mounted therein a pin 58, the radially inwardly ends of which are arranged to fit in annular recess 59 extending about extension member 35. Recess 59 is provided with a tapered camming surface 60 which mates with a similar camming surface on each of the pins 58.

Each of the pins 58 is retained in position by a shear pin 62 which extends outwardly into an annular retaining ring 64 which extends about the external surface of piston extension portion 56 as shown in FIG. 1. Retainer ring 64 acts to keep pins 58 retained in recess 59 thereby releasably attaching annular piston 50 to extension member 35.

Portions heretofore described forming the annular chamber 38 are sized sufficiently large such that the axial end surface of cylinder end 21 forming annular chamber 38 will have a surface area substantially the same as the internal cross-sectional area of extension member 35. Further, the cross-sectional area of piston 50 and portion 56 thereof will together match that of the opposed surface of cylinder end 21. Since chamber 38 is in fluid communication with the interior of extension member 35, and hence with line pressure in pipeline 12 by virtue of communication through port 39, the pressure in chamber 38 will equalize with the pressure in pipeline 12. Normal fluid pressure in pipeline 12 will generally apply tension forces to housing 16 and extension member 35 to urge the same axially apart in the direction of the arrows shown in FIG. 2. However, an equal and opposite force will be applied to annular chamber 38 whereby housing 16 and extension member 35 are urged axially together as indicated by arrows shown in annular chamber 38.

In certain instances, it is desirable to have means for rendering the shear discs 42 inoperable. Such occasions might arise while connector 11 is being initially installed. For example, connector 11 could be installed in the manner shown in FIG. 1 in a pipeline such as pipeline 12 on board a pipe lay barge. Means for rendering shear disc 42 inoperative include a retainer ring 68 which is comprised of two semi-circular halves arranged to be fitted about end ring 45 in the manner shown in FIG. 1. Retainer ring 68 is provided with an axially extending annular sleeve portion 69 having a radially inwardly extending flange 70 which is arranged to be received in a mating recess in end ring 45. Thus mounted, retainer ring 68 bears against flange 40 of extension member 35 and engages end ring 45, thereby preventing axial separation of the same so as to provide the coupling with a tension strength equal to that of pipeline 12. However, when it becomes desirable to render shear disc 42 operable, retainer ring 68 is arranged to be removed by turning inwardly on a plurality of bolts 71 which are axially threaded through sleeve portion 69 and arranged to butt against a circumferentially outward surface of end ring 45. By turning on bolts 71, flange 70 is sprung radially outwardly to disengage retainer ring 68, at which point it may be removed and separated and taken to the surface by a diver. The connector of the invention is then ready to perform its function of providing a weak point in pipeline 12.

Assuming that connector 11 is installed in a sub-sea pipeline, for example, in the condition shown in FIG. 1, but with retainer ring 68 removed, pressure is transmitted to annular chamber 38 through port 39 which offsets the tension forces created by that pressure in pipeline 12, such that there is thus produced a pressure balanced connection. Assume further that pipeline 12 is then subjected to sufficient tension forces so as to cause parting of the weak point provided by coupling 11. In other words, tension force is applied which is sufficiently large to shear disc 42. In such parting, coupling 11 and the portions thereof move to the position shown in FIG. 2, which is accomplished as will now be described.

As shear disc 42 is ruptured, extension member 35 is then pulled out of cylinder housing 16. In so moving, extension member 35 carries with it annular piston 50, which travel continues until the forward end of retainer ring 64 strikes the internal surface of cylinder end 21, which thereby causes shearing of shear pins 62. Further withdrawing of extension member 35 from cylinder housing 16 then causes retainer ring 64 to butt against the adjacent surface of annular piston 50. Thus positioned, pins 58 are then free to travel radially outwardly and are cammed in that direction by cam surface 60 to the fully retracted position as shown in FIG. 2. At this point, extension member 35 is free to be withdrawn entirely from cylinder housing 16.

It will thus be observed that the invention provides a pressure balanced weak point in a pipeline. There are many advantages to the aforesaid connector. One advantage of the particular arrangement of retainer ring 68 is that in order to render the connector operable or place in the operable mode, a diver is required to physically remove the retainer ring 68, for example, in a sub-sea location. When he does so, the operator can be assured that the system is completely activated and ready to function.

The main function of shear pins 62 is simply to keep retainer ring 64 in position during normal handling of the connector. The arrangement of retainer ring 64 and pins 62 and 58 provides a method to quickly and effectively release piston 50 so that housing 16 and extension member 35 may be completely separated.

It should be understood the size of annular chamber 38 can be varied to either increase or decrease the balancing pressure load to provide a positive loading in either direction to possibly compensate for the friction of the packings or for any other reason it may be deemed necessary. Stated otherwise, the balancing pressure exerted in annular chamber 38 need not be exactly equal in order for the connector to work. A positive loading can be applied in either the tension or compression direction as may be required, by varying the size of annular chamber 38. Hence, it may be stated that the connector is at least partially pressure balanced.

It should also be understood that piston 50 forms an annular chamber 72 between it and cylinder head 18, which chamber may be vented to the surrounding environment through port 73 so that a differential pressure will exist across piston 50. Further, port 73 may be provided with a check valve, and annular chamber 72 can be filled with a clean oil or fluid to prevent corrosion or malfunctioning or the system in which case pressure would still act on the fluid and the systems would still work in the manner disclosed above.

In certain circumstances, it may be desirable to have a pressure balanced weak point in a connector which is arranged to be a slip joint, to thereby eliminate or reduce residual stresses in the pipeline, in addition to its acting as a weak point. Referring now to FIG. 3, an alternative embodiment is shown incorporating this slip joint feature. There it will be observed that all elements of the connector previously described in connection with FIGS. 1 and 2 are the same except as will be noted hereinafter. In other words, extension member 35 is shown mounted inside of cylinder end 21. End 45 is retained in place by bolts 46 which thereby supports split ring 42 in the same manner as with the previous embodiment. In addition, retainer ring 68 is shown mounted over the end of the connector rendering the same inoperable until removed. However, the change in this embodiment is with respect to flange 40 which extends radially outwardly from extension member 35. In this embodiment, there is provided an enlarged generally channeled shaped annular recess 71 formed in flange 40 so as to provide disc 42 a substantial axial distance of free travel both in tension and compression directions before contact with a shoulder of channel 71 is made. Upon removal of retainer ring 68, the pipeline 12 can be shortened or lengthened by the axial length of recess 71. The embodiment shown in FIG. 3, therefore, has the additional advantage of being able to compensate for some pipeline "move or creep" thereby reducing or eliminating the residual stress that is normally found in most pipelines. If excess tension load is applied to pipeline 12, the disc 42 will contact the shoulder at the end of recess 71 and the weak point will function in the normal manner.

The foregoing invention thus provides a separable and at least partially pressure balanced safety pipeline connector. The amount of tension forces which the connector can withstand is controlled by the strength of shear disc 42; and hence, a pre-determined tension force can be established at which the connector will part. The connector is arranged to have full strength capability of the pipeline prior to the same being installed and retainer ring 68 removed, at which point, there is positive proof that the system has been placed in the actuated mode or ready position.

Further modification and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described is to be taken as the presently preferred embodiments. Various changes may be taken in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A separable at least partially pressure balanced safety pipeline connector, comprising:
    a housing having one axial end adapted for connection to said pipeline, and having the other axial end open;
    a pipe extension member having one axial end adapted for connection to said pipeline for transmission of line fluid therethrough and with the other axial end arranged for being telescopically received coaxially in said housing in sealable relationship therewith;
    shear means for restraining said housing and extension member against axial separation in response to axial tension forces applied thereto below a predetermined level and shearable above said to permit axial separation of said housing and extension member;
    an annular piston supported between said housing and said extension member forming an annular pressure chamber about said extension member;
    means for releasably attaching said piston to one of said housing and said extension member and being releasable after shearing of said shear means;
    and conduit means for communicating line pressure to said annular chamber, whereby the effect of line pressure in said pipeline normally urging axial separation of said housing and said extension member is at least partially balanced by the pressure within said annular chamber.

2. The invention as claimed in claim 1 including:
    removable retainer means for retaining said housing and extension member in said telescoped position and rendering said shear means inoperative until the retainer means is removed from said connector.

3. The invention as claimed in claim 1 wherein:
    said shear means includes a rupturable disc supported between said housing and said extension member.

4. The invention as claimed in claim 1 wherein:
    said shear means is connected to one of said housing and said extension member;
    and the other one of said housing and said extension member is provided with axially spaced apart shoulder means for engaging said shear means, said shoulder means being axially spaced apart a distance sufficient to provide said shear means with a determined length of free travel during axially compression and extension of said connector.

* * * * *